Sept. 23, 1941.                E. D. CLICKNER                2,257,000
                                FISHING REEL
                             Filed July 8, 1940

INVENTOR.
Earle D. Clickner
BY Earl D. Chappell
ATTORNEYS

Patented Sept. 23, 1941

2,257,000

UNITED STATES PATENT OFFICE 2,257,000

FISHING REEL

Earle D. Clickner, Kalamazoo, Mich., assignor to Shakespeare Company, Kalamazoo, Mich., a corporation of Michigan Application July 8, 1940, Serial No. 344,313

9 Claims. (Cl. 242—84.5)

This invention relates to improvements in fishing reels.

The main objects of this invention are:

First, to provide an improved drag or brake mechanism for fishing reels which is particularly desirable for use in fishing reels commonly designated as single action or trout reels.

Second, to provide a drag or brake mechanism for fishing reels which is automatically actuated to increase the braking action on the rotation of the spool in the line unwinding direction as compared to the braking action when the spool is rotated in the line winding direction, this variation being automatically secured or brought about by the change in direction or rotation of the spool.

Third, to provide a variable brake or drag mechanism having these advantages which eliminates the necessity for use of a noisy click drag mechanism commonly used in reels of this type and is effective in preventing over-run of the spool even when stripping the line by hand as, for example, when casting or when a hooked fish is making a sudden run.

Fourth, to provide a structure having these advantages which is very simple and compact and may be embodied in reels of the type now extensively used without material or expensive changes in the structure thereof.

Objects relating to details and economies of the invention will appear from the description to follow. The invention is defined and pointed out in the claims.

A preferred embodiment of the invention is illustrated in the accompanying drawing, in which.

Figure 1:
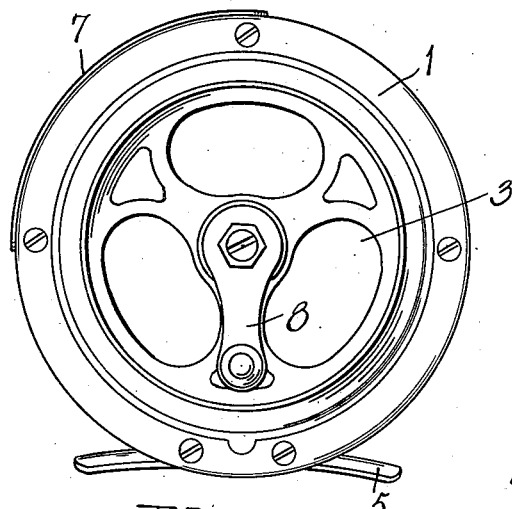
Fig. 1 is a side elevation of a fishing reel of the single action type embodying the features of my invention.
Figure 2:
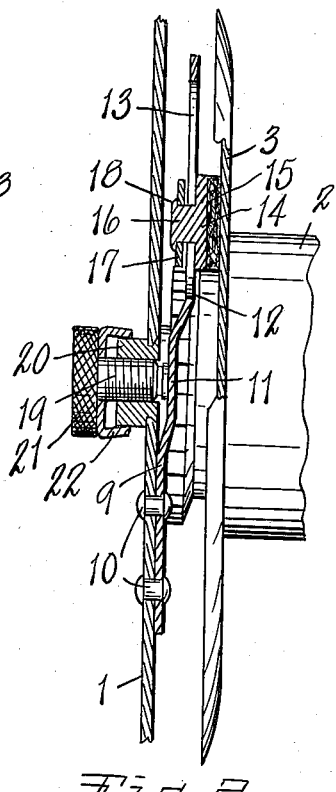
Fig. 2 is an enlarged fragmentary view, partially in section on the curved line 2—2 of Fig. 3.
Figure 3:
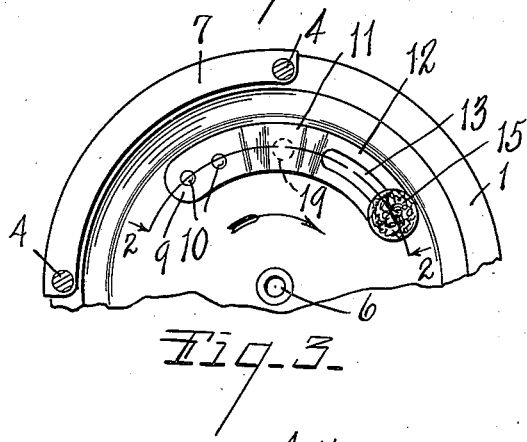
Fig. 3 is a fragmentary inside view of the tail end member of the reel showing the mounting of my improved brake or drag mechanism thereon, the brake shoe being shown in one of its extreme positions.
Figure 4:
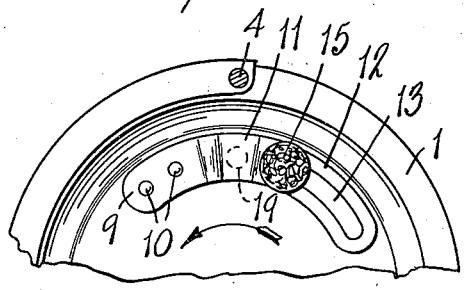
Fig. 4 is a similar view with the brake shoe at the other extreme of its position.

In the accompanying drawing, 1 represents one of the end members of the reel frame and 2 the spool which is provided with end flanges 3. The frame end members, only one of which is illustrated, are connected by suitable pillars 4 and is provided with a reel seat 5. The spool is journaled in the frame, one of the spool journal bearings being indicated at 6. 7 is a line or frame protector arranged on the edge of the frame member 1. The crank 8 is secured directly to the shaft or spindle of the spool as is the practice in so-called "single action" reels.

My improved brake or drag mechanism comprises the curved blade spring member 9 which is secured to the frame by means of the rivets 10 disposed at one end of the spring brake member. This brake member has offsets or steps 11 and 12 whereby the swinging end of the member 9 is supported for springing action in spaced relation both to the spool flange and to the frame end member on which it is mounted.

The member 9 is preferably curved so as to permit its being of suitable length and also to permit the curved slot 13 being formed in its springing end.

The brake shoe 14 is provided with a suitable facing 15 coacting with the flange of the spool and has an outwardly projecting stud 16 which slidably and rotatably engages in the slot 13. A clip 17 retains the stud in position while permitting free sliding movement of the brake shoe in the slot.

The adjusting screw 19 is threaded into the outwardly projecting stud 20 mounted on the frame, the adjusting screw being provided with a knurled head 21 and arranged with its inner end engaging the stepped portion 11 of the spring brake member. A flanged friction member 22 carried by the adjusting screw engages the stud for frictionally retaining the screw in its adjusted position.

The brake or drag shoe is in continuous engagement with the spool so that when the spool is rotated in its line unwinding direction, the brake shoe is shifted to its position at the inner end of the slot and it will be noted is quite close to the adjusting screw which constitutes an abutment for the spring. When the spool is rotated in line winding or reeling in direction, the brake shoe is automatically shifted to the outer end of the slot or the end of the brake member remote from the adjusting screw or abutment, thereby resulting in a minimum friction. It is not intended that the friction of the brake shoe or the drag of the brake shoe shall be entirely removed at any time as it is necessary to maintain this friction in order to secure the automatic action described; that is, the automatic variation in the braking friction, and further, this eliminates over-running of the spool either when stripping off by hand or when a fish is making a sudden run or as a result of spinning the spool in winding in.

The mechanism is capable of very fine adjustments to secure the desired braking action or friction—that is, that desired by the particular user, and it is noiseless. A further advantage is the simplicity and economy and durability of the structure.

I have not attempted to illustrate or describe various modifications and adaptations of my invention which I contemplate as it is believed that this disclosure will enable those skilled in the art to modify or adapt my improvements as may be desired.

Having thus described my invention, what I claim as new and desire to secure by Letters Patent, is:

1. In a fishing reel, the combination with a frame and a flanged spool journaled therein and provided with a crank, of a curved spring brake member having stepped offsets therein disposed between the frame and one flange of the spool and secured at one end to said frame, its free inwardly offset end having a segmental slot therein, a disk-like brake shoe provided with a stem slidably and rotatably engaged in said slot, and an adjusting screw on the frame in sustaining engagement with said brake member.

2. In a fishing reel, the combination with a frame and a spool journaled therein, of a curved spring brake member secured at one end to said frame and having a segmental slot in its other end, an adjusting screw engaging said brake member between its said slot and its point of attachment to said frame, and a disk-like brake shoe slidably and rotatably engaged in said slot and supported by said spring brake member for frictional coaction with said spool whereby it is automatically shifted in said slot by reversing the direction of rotation of said spool and its frictional engagement with the spool thereby varied.

3. In a fishing reel, the combination with a frame and a flanged spool journaled therein, of a spring brake member secured at one end to said frame with its other end free for spring action, an adjusting screw on the frame coacting with said brake member, and a brake shoe slidably mounted on the springing end of said brake member, said screw sustainingly engaging said brake member adjacent one end of the path of movement of the shoe thereon.

4. In a fishing reel, the combination with a frame and a spool journaled therein, of a spring brake member mounted on said frame adjacent said spool, a brake shoe mounted on said brake member in frictional engagement with said spool and for limited sliding movement on said brake member as the direction of rotation of said spool is reversed, and manual adjusting means on the frame sustainingly engaging said spring brake member and positioned adjacent an end of the path of movement of said brake shoe so that the braking action of the brake on the spool is the greatest when the shoe is adjacent said adjusting means and the spool is rotated in line unwinding direction, and is automatically reduced by the sliding movement of said brake shoe away from the adjusting means when the spool is rotated in line winding direction.

5. In a fishing reel, the combination with a frame and a spool journaled therein, of a spring brake member mounted on said frame adjacent said spool, and a brake shoe mounted on said brake member in frictional engagement with said spool and for limited sliding movement on said brake member as the direction of rotation of said spool is reversed, said spring brake member being positioned so that the braking action of the brake on the spool is the greatest when the spool is rotated in line unwinding direction and is automatically reduced by the sliding movement of said brake shoe when the spool is rotated in line winding direction.

6. In a fishing reel, the combination with the frame and a spool journaled therein, of a spring brake member mounted on said frame, and a brake shoe mounted on said brake member for sliding movement thereon and in frictional engagement with said spool at both limits of its sliding movement, said spring brake member being conformed and supported so that there is a substantial variation in the frictional engagement of the brake shoe with the spool as the brake shoe is shifted from one position to another on said brake member.

7. In a reel of the type described, a frame having a spool rotatable therein and an elongated spring brake support fixed at one end to the frame, the other end thereof being springable toward and from the spool, said brake support having an elongated slot therein, a brake shoe slidable in said slot in continuous frictional sliding engagement with said spool, and an adjusting member on said frame sustainingly engageable with said support intermediate the ends thereof and adjacent the extremity of the slot remote from the free end of the support, said shoe being slidable in said slot in accordance with the rotation of the spool in one direction or another and exerting increased frictional drag on the spool when disposed adjacent the adjusting member than when remote therefrom.

8. In a reel of the type described, a frame having a spool rotatable therein and an elongated spring brake support fixed at one end to the frame, the other end thereof being springable toward and from the spool, a brake shoe slidable on said support in continuous frictional sliding engagement with said spool, and an adjusting member on said frame sustainingly engageable with said support intermediate the ends thereof and remote from the free end of the support, said shoe being slidable on the support on the side of said adjusting member adjacent the free end of the support in accordance with the rotation of the spool in one direction or another and exerting increased frictional drag on the spool when disposed adjacent the adjusting member than when remote therefrom.

9. In a reel of the type described, a frame having a spool rotatable therein and an elongated spring brake support associated therewith, one end of said support being springable toward and from the spool, a brake shoe slidable on said support in continuous frictional sliding engagement with said spool, and an adjusting member on said frame sustainingly engageable with said support at a point remote from the free end of the support, said shoe being slidable on the support on the side of said adjusting member adjacent the free end of the support in accordance with the rotation of the spool in one direction or another and exerting increased frictional drag on the spool when disposed adjacent the adjusting member than when remote therefrom.

EARLE D. CLICKNER.